United States Patent
Schaedler et al.

(10) Patent No.: US 7,060,762 B2
(45) Date of Patent: Jun. 13, 2006

(54) PREPARATION OF AQUEOUS STYRENE-BUTADIENE POLYMER DISPERSIONS

(75) Inventors: Volker Schaedler, Mannheim (DE); Lambertus Manders, Ludwigshafen (DE); Roland Ettl, Hassloch (DE); Thomas Wirth, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/956,049

(22) Filed: Sep. 20, 2001

(65) Prior Publication Data

US 2002/0082374 A1    Jun. 27, 2002

(30) Foreign Application Priority Data

Sep. 21, 2000   (DE) ................ 100 46 930

(51) Int. Cl.
 *C08F 2/22*  (2006.01)
 *C08F 2/38*  (2006.01)
 *C08F 236/06*  (2006.01)
 *C08F 236/10*  (2006.01)
 *D21H 17/35*  (2006.01)

(52) U.S. Cl. .................. 526/87; 526/89; 526/222; 526/224; 526/340; 526/340.1

(58) Field of Classification Search .............. 526/89, 526/224, 340, 340.1
See application file for complete search history.

(56) References Cited

U.S. PATENT DOCUMENTS

| 4,002,812 | A | * | 1/1977 | Hendy ................ 526/59 |
| 5,137,977 | A | | 8/1992 | Saitoh et al. |
| 5,444,118 | A | | 8/1995 | Tsuruoka et al. |
| 5,637,644 | A | * | 6/1997 | Tsuruoka et al. .......... 524/828 |
| 5,700,852 | A | | 12/1997 | Iwanaga et al. |
| 5,786,100 | A | | 7/1998 | Tsuruoka et al. |

FOREIGN PATENT DOCUMENTS

| EP | 0 407 059 | 1/1991 |
| EP | 0 529 927 | 3/1993 |

\* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

A process for preparing an aqueous styrene-butadiene polymer dispersion by free-radical aqueous emulsion polymerization of a monomer mixture M that comprises
 styrene,
 butadiene, and if desired
 up to 30% by weight, per 100% by weight of monomers, of ethylenically unsaturated comonomers other than styrene and butadiene;

by a monomer feed technique that includes supplying to the polymerization reaction a regulator system containing,
 from 0.02 to 0.4% by weight of terpinolene and
 from 0.5 to 2% by weight of an organic compound S containing at least one SH group.

26 Claims, No Drawings

PREPARATION OF AQUEOUS STYRENE-BUTADIENE POLYMER DISPERSIONS

The present invention relates to a process for preparing an aqueous styrene-butadiene polymer dispersion by free-radical aqueous emulsion polymerization of a monomer mixture containing styrene and butadiene by a monomer feed technique. The invention also relates to the styrene-butadiene polymer dispersions obtainable by this process and to their use as binders in colored paper coating slips.

Paper and cardboard are frequently enhanced in their printability and their optical properties such as gloss, whiteness, and opacity in the course of their production with a pigmented coating. The coating compositions used in this case, also referred to as colored paper coating slips, comprise as well as the pigment a binder whose purpose is to anchor the individual pigment particles to one another and to the paper surface and so to form a continuous pigment layer.

Those papers and cardboards which are coated are, in particular, graphics paper and cardboard intended for printing. Coating is also carried out on specialty papers such as labels, wallpapers and unprinted silicone papers which are used as backings for self-adhesive labels.

Although the binder content of the paper coating compositions is generally only up to 30 parts by weight per 100 parts by weight of pigment, it has a critical influence on the properties of the paper, especially the print performance and the appearance. Examples of important print performance parameters include smoothness, absence of blisters, compressibility, and absorbency for liquids, such as printing inks or fountain solution, for example. Another important criterion is the stability of the coating to mechanical stresses. High mechanical stability must be ensured in offset printing in particular, since owing to the tack of the printing inks used the surface is subjected to very high mechanical stress. Because of the fountain solution used in offset printing, this mechanical strength must also be ensured in the wet state. The mechanical load-bearing capacity of a paper coating is also known as the pick resistance and a mechanical load-bearing capacity in the wet state as the wet pick resistance.

The pick resistance of the paper coatings is becoming increasingly important owing to the fact that the print speeds, which have risen sharply in recent years, are placing an increasing mechanical load on the paper surface. Because of this, the aqueous polymer dispersions used in the prior art as binders are being employed in increasingly greater weight fractions in the coating. One consequence of this, however, is an unwanted increase in the costs of the material inputs for paper coating. Moreover, the increased binder fraction is altering the optical properties and the printability of the paper in a deleterious way. For instance, the increased binder fraction leads to a retarded absorption behavior of the printing ink, one of whose possible consequences is the offsetting of the printing ink within the stack.

EP-A 407 059 describes a process for preparing butadiene-containing copolymer latices having a gel fraction of at least 5% in the presence of chain transfer agents. The chain transfer agents specified include mixtures of terpene hydrocarbons and sulfur-containing chain transfer agents. The latices described therein may be used as binders in paper coating compositions.

DE 195 12 999 discloses paper coating compositions whose binder comprises a styrene-butadiene copolymer latex in which the addition polymer has two glass transition points that differ from one another by at least 5 K. The preparation takes place in general by emulsion polymerization of the constituent monomers in the presence of chain transfer agents. The chain transfer agents used include alkyl mercaptans and hydrocarbons such as terpinolene or α-methylstyrene dimer, and also combinations thereof.

The binders described in the prior art are frequently unable to meet the pick resistance requirements, especially the wet pick resistance requirements, to the desired extent. The prior art's proposed use of terpinolene as polymerization regulator leads to problems during the polymerization under the conditions it specifies. In particular, the residual monomer content of the resulting dispersion is unacceptably high.

It is an object of the present invention to provide a polymer latex which, used even in small amounts in paper coating compositions, results in paper coatings possessing high dry and wet pick resistance.

We have found that this object is achieved, surprisingly, by a styrene-butadiene polymer latex prepared by free-radical aqueous emulsion polymerization of a styrene and butadiene monomer mixture by a monomer feed technique, said process comprising supplying the polymerization reaction in the course thereof with a regulator system containing per 100% by weight of monomers from 0.02 to 0.4% by weight of terpinolene and
from 0.5 to 2% by weight of an organic compound S containing at least one SH group.

The present invention accordingly provides a process for preparing an aqueous styrene-butadiene polymer dispersion by free-radical aqueous emulsion polymerization of a monomer mixture M comprising styrene,
butadiene, and if desired
up to 30% by weight, based on 100% by weight of monomers M, of ethylenically unsaturated comonomers other than styrene and butadiene by a monomer feed technique, which comprises supplying the above-described regulator system to the polymerization reaction in the course thereof.

The polymer dispersions obtainable by the process feature a low coagulum fraction, high mechanical stability, and a low residual monomer content. Moreover, these dispersions can be used to prepare paper coating compositions which, even at low binder fractions, are superior to the prior art paper coating compositions in terms of pick resistance, especially wet pick resistance. The polymer dispersions obtainable by the process of the invention are therefore likewise provided by the present invention.

The regulator system of the invention contains preferably from 0.05 to 0.35% by weight and in particular from 0.1 to 0.3% by weight of terpinolene (4-(2-propylidene)-1-methylcyclohex-1-ene) and preferably from 0.6 to 1.8 and in particular from 0.7 to 1.5% by weight of an organic compound S containing at least one SH group. Preferred compounds S are soluble in the hydrophobic monomers styrene and butadiene. They are selected in particular from $C_4$–$C_{18}$ alkyl mercaptans such as n-hexyl mercaptan, n-octyl mercaptan, tert-octyl mercaptan, n-decyl mercaptan, n-dodecyl mercaptan, tert-dodecyl mercaptan, n-hexadecyl mercaptan, and stearyl mercaptan.

In accordance with the invention the total amount of terpinolene in the regulator system is less than the total amount of compound S. In general, the weight ratio of terpinolene to compounds S is at least 1:100, preferably at least 1:50, and in particular at least 1:10. At most it is 1:1.25, in particular 1:1.5, and with particular preference 1:2.

The term monomer feed technique is commonly used in the prior art and in contradistinction to the term batch technique refers to a polymerization technique in which the monomers to be polymerized are not included fully in the initial charge to the reaction vessel but in which instead the majority of the monomers are supplied to the polymerization reaction, i.e., to the polymerization vessel under polymerization conditions, over a defined time period, preferably at the rate at which they are consumed. It is preferred to supply at least 80% and in particular at least 90% of the monomers M to be polymerized to the polymerization reaction. "Under polymerization conditions" is of course a reference to the contents of the polymerization vessel being at the required polymerization temperature and the polymerization having been initiated by the addition of a portion of the polymerization initiator, e.g., from 0.5 to 20% by weight of the total amount of polymerization initiator required.

The monomer feed technique is commonly implemented by including the desired amount of polymerization initiator, preferably in the form of an aqueous solution, together if desired with a portion of the monomers M to be polymerized, e.g., from 0.5 to 20%, in particular from 1 to 10% by weight, in the initial charge to the polymerization vessel and heating this initial charge to polymerization temperature. It is also possible to include an aqueous solution of the desired amount of polymerization initiator in the initial charge to the polymerization vessel, to heat this solution to polymerization temperature, and then to supply the monomers. In this case it has been found appropriate if, in order to initiate the polymerization reaction, a portion of the monomers that preferably does not exceed 20% of the monomers to be polymerized and in particular is from 0.5 to 20 and with particular preference from 1 to 10% of the monomers to be polymerized is supplied to the polymerization vessel in one portion. In both variants, the remaining monomers are then supplied to the polymerization vessel generally at the rate at which they are consumed, e.g., within a time period from 30 min to 20 h, in particular from 1 h to 10 h.

The monomers may be supplied to the polymerization reaction as they are or in the form of an aqueous emulsion. Butadiene and styrene can be supplied to the polymerization reaction as a mixture or by way of separate feeds. It is preferred to supply styrene and also mixtures containing styrene to the polymerization in the form of an aqueous emulsion.

In principle it is possible when adding the monomers to vary the proportion of the different monomers in the feed, especially the proportions of the styrene/butadiene mix. In this case polymer dispersions are obtained whose polymer particles have a nonhomogeneous construction in terms of the polymers they contain, or whose polymer particles are different, with different polymer compositions. In one preferred embodiment, the proportion of the monomers in the feed, or at least the styrene/butadiene mix proportion, is kept substantially constant. This means that the weight ratio of the monomers to one another, or at least the weight ratio of styrene to butadiene, in the feed during the monomer addition alters not more than 20%, preferably not more than 10%. The resultant polymers then exhibit no multiphasedness, which would be manifested, for example, in two or more glass transition temperatures in the DSC of the polymer.

In accordance with the invention, in a similar way to the monomer addition, the addition of regulator takes place in the course of the polymerization reaction. It is of course possible to include a portion of the regulator, generally not more than 20% of the overall amount, in the initial charge to the polymerization vessel, especially when monomers M are also charged to the polymerization vessel. Preferably, the regulator system is added in parallel to the addition of monomer, i.e., the majority, in particular at least 80% and with particular preference the entirety of the regulator system, is added within the time period within which the monomers to be polymerized are also supplied to the polymerization reaction. In this context it has been found particularly appropriate to supply the regulators to the polymerization reaction together with the monomers, i.e., as a mixture in the monomers, or in the monomer emulsion. Of course, it is also possible to add the regulator by way of a separate feed.

In the context of the addition of the regulator system, it has proven appropriate if during its addition the composition of the regulator system is altered in such a way that the fraction of terpinolene in the regulator system still to be supplied goes down. In other words, this means that the ratio of the amount of terpinolene already supplied to the amount of compound S already supplied goes down during the addition of the regulator system. With particular preference, the regulator system is supplied in such a way that the addition of the terpinolene to the polymerization reaction has ended before the addition of the compound S has ended. Preferably, at the beginning of the addition of the regulator system, exclusively terpinolene and no organic compound S is added. In particular, addition of the compound S commences only when at least 50%, in particular at least 80%, and with particular preference at least 90% of the amount of terpinolene has already been supplied to the polymerization reaction.

The alteration in the quantitative proportion of terpinolene to the compound S may be done in stages or continuously. The proportion may be altered by supplying terpinolene and compound S to the polymerization reaction by way of separately controllable regulator feeds. It is of course also possible to meter the desired amount of terpinolene and the compound S to the quantities of monomer that are to be supplied, the metered addition taking place in a mixing means downstream of the monomer supply vessels. In this way it is possible with great simplicity to produce both continuous and stagewise alterations in the proportion of terpinolene and compound S. In a particularly simple variant, the regulator system is mixed with different monomer batches to be supplied in succession to the polymerization vessel, with the proportion of compound S to terpinolene increasing in the monomer batches in the sequence in which they are added. Where butadiene and styrene are added by way of separate monomer feeds, it is of course possible to alter the proportion of the two regulators to one another in only one of the two monomer batches and to keep it constant in the other. It is also possible, of course, to supply the regulator in only one of the two monomer feeds and to keep the other monomer feed free of regulator.

Initiator systems suitable for the process of the invention are in principle those known for a free-radical aqueous emulsion polymerization. Preferred initiators are water-soluble. Particularly preferred initiators are those containing a peroxide group, such as organic and inorganic peroxides and hydroperoxides. Particular preference is given to hydrogen peroxide and the salts of peroxodisulphuric acid, e.g., sodium peroxodisulfate. Also suitable are organic hydroperoxides such as tert-butyl hydroperoxide and cumene hydroperoxide. In some cases it has proven appropriate to employ the abovementioned peroxides together with a reducing agent and/or a metal compound which is able to alter its valence state.

Suitable reducing agents are ascorbic acid, hydroxymethanesulfinic acid, the bisulfite adduct of acetone, sodium sulfite or sodium hydrogen sulfite. Examples of suitable metal compounds are the salts and water-soluble complexes of iron, of vanadium or of copper. The free-radical initiator is commonly used in an amount of from 0.1 to 3% by weight, based on the monomers to be polymerized.

The pressure and temperature of polymerization are of minor importance. Polymerization is generally conducted at temperatures between room temperature and 120° C., preferably from 40 to 110° C., and with particular preference between 50 and 100° C., at a pressure in the range from 1 to 10 bar.

The free-radical aqueous emulsion polymerization generally takes place in the presence of surface-active compounds. By surface-active compounds are meant both emulsifiers and protective colloids, which unlike the emulsifiers generally have a molecular weight above 2 000 daltons and which are soluble in water. The surface-active substances may be supplied together with monomers, in the form for example of an aqueous monomer emulsion. It is of course also possible to include some or all of the surface-active substances in the initial charge to the polymerization vessel.

Preferred emulsifiers are anionic and nonionic emulsifiers, which are generally used in amounts of from 0.2 to 10% by weight, preferably from 0.5 to 5% by weight, based on the polymer in the dispersion or on the monomers M to be polymerized.

The anionic emulsifiers include alkali metal salts and ammonium salts of alkyl sulfates (alkyl: $C_8$–$C_{20}$), of sulfuric monoesters with ethoxylated alkanols (EO units: from 2 to 50, alkyl: $C_8$ to $C_{20}$) and with ethoxylated alkylphenols (EO units: from 3 to 50, alkyl: $C_4$–$C_{20}$), of alkylsulfonic acids (alkyl: $C_8$ to $C_{20}$) and of alkylarylsulfonic acids (alkyl: $C_4$–$C_{20}$). Further suitable anionic emulsifiers are given in Houben-weyl, Methoden der organischen Chemie, Volume XIV/1, Makromolekulare Stoffe [Macromolecular substances], Georg-Thieme-Verlag, Stuttgart, 1961, pp. 192–208.

The anionic surface-active substances also include compounds of the formula I

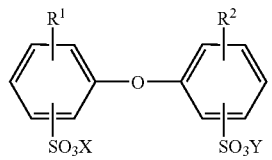

(I)

in which $R^1$ and $R^2$ are hydrogen or linear or branched alkyl radicals having from 6 to 18 carbon atoms and in particular having 6, 12 and 16 carbon atoms, $R^1$ and $R^2$ not both being hydrogen simultaneously. X and Y are preferably sodium, potassium or ammonium, sodium being particularly preferred. It is common to use technical-grade mixtures containing from 50 to 90% by weight of the monoalkylated product, an example being Dowfax® 2A1 (trademark of Dow Chemical Company). The compounds I are common knowledge, e.g. from U.S. Pat. No. 4,269,749.

Suitable nonionic emulsifiers are araliphatic or aliphatic nonionic emulsifiers, examples being ethoxylated mono-, di- and trialkylphenols (EO units: from 3 to 50, alkyl: $C_4$–$C_9$), ethoxylates of long-chain alcohols (EO units: from 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: from 3 to 50) and, of these, particular preference to those based on oxo alcohols and naturally occurring alcohols having a linear or branched $C_{12}$–$C_{18}$ alkyl radical and a degree of ethoxylation of from 8 to 50.

In the process of the invention it is preferred to use anionic emulsifiers or combinations of at least one anionic and one nonionic emulsifier.

Examples for suitable protective colloids are polyvinyl alcohols, starch derivatives and cellulose derivatives, carboxyl-containing polymers such as homopolymers and copolymers of acrylic acid and/or of methacrylic acid with comonomers such as styrene, olefins or hydroxyalkyl esters, or vinylpyrrolidone homopolymers and copolymers. A detailed description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, pp. 411–420. Mixtures of emulsifiers and/or protective colloids may also be used.

With a view to their use as binders in paper coating compositions, the monomer mixtures to be polymerized contain not only from 20 to 80% by weight, in particular from 40 to 70% by weight, of styrene and from 20 to 80% by weight, in particular from 30 to 55% by weight, of butadiene but also up to 30% by weight, preferably up to 20% by weight, and in particular up to 10% by weight, e.g., from 0.5 to 20 or from 1 to 10% by weight, of ethylenically unsaturated comonomers other than styrene and butadiene. Examples of comonomers are:

monoethylenically unsaturated monomers with an acid group, such as monocarboxylic and dicarboxylic acids having from 3 to 10 carbon atoms such as acrylic acid, methacrylic acid, crotonic acid, acrylamidoglycolic acid, vinylacetic acid, maleic acid, itaconic acid, and the monoesters of maleic acid of $C_1$–$C_4$ alkanols, ethylenically unsaturated sulfonic acids such as vinylsulfonic acid, allylsulfonic acid, styrenesulfonic acid, 2-acrylamidomethylpropanesulfonic acid, and ethylenically unsaturated phosphonic acids, e.g., vinylphosphonic acid, allylphosphonic acid, styrenephosphonic acid and 2-acrylamido-2-methylpropanephosphonic acid and the water-soluble salts thereof, examples being the alkali metal salts thereof, preferably acrylic acid and methacrylic acid. Such monomers may be present in the monomers M in an amount of up to 10% by weight, e.g. from 0.1 to 10% by weight, preferably from 0.1 to 4% by weight;

amides of monoethylenically unsaturated carboxylic acids, such as acrylamide and methacrylamide, and also the N-(hydroxy-$C_1$–$C_4$ alkyl)amides, preferably the N-methylolamides of ethylenically unsaturated carboxylic acids, such as N-methylolacrylamide and N-methylolmethacrylamide. Such monomers may be present in the monomer M in an amount of up to 10% by weight, e.g., from 0.1 to 10% by weight, preferably from 0.1 to 4% by weight;

hydroxyalkyl esters of monoethylenically unsaturated carboxylic acids, especially hydroxyethyl and hydroxypropyl and hydroxybutyl esters, e.g., hydroxyethyl acrylate, hydroxypropyl acrylate, hydroxyethyl methacrylate and hydroxypropyl methacrylate. Such monomers may be present in the monomers M in an amount of up to 10% by weight, e.g., from 0.1 to 10% by weight, preferably from 0.5 to 5% by weight;

ethylenically unsaturated nitriles having preferably from 3 to 10 carbon atoms, such as acrylonitrile and methacrylonitrile. Such monomers may be present in the monomers M in an amount of up to 30% by weight, e.g., from 1 to 30% by weight, preferably from 5 to 20% by weight;

reactive monomers: the reactive monomers include those having a reactive functionality which is suitable for crosslinking. Besides the abovementioned ethylenically unsaturated carboxylic acids, their N-alkylolamides and hydroxyalkyl esters, these include monomers containing a carbonyl group or an epoxy group, examples being N-diacetoneacrylamide, N-diacetonemethacrylamide, acetylacetoxyethyl acrylate and acetylacetoxyethyl methacrylate, glycidyl acrylate and glycidyl methacrylate. Such monomers may be present in the monomers M in an amount of up to 10% by weight, e.g., from 0.5 to 10% by weight;

and crosslinking monomers: the crosslinking monomers include those containing at least two nonconjugated ethylenically unsaturated bonds, examples being the di- and triacrylates and di- and trimethacrylates of difunctional and trifunctional alcohols, e.g., ethylene glycol diacrylate, diethylene glycol diacrylate, triethylene glycol diacrylate, butanediol diacrylate, hexanediol diacrylate, trimethylolpropane triacrylate and tripropylene glycol diacrylate. Such monomers may be present in the monomers M in an amount of up to 2% by weight, preferably not more than 1% by weight, e.g., from 0.01 to 2% by weight, preferably from 0.01 to 1% by weight. In one preferred embodiment the monomers M do not include any crosslinking monomer.

Preferred comonomers are the monoethylenically unsaturated monocarboxylic and dicarboxylic acids having from 3 to 10 carbon atoms, their amides, their $C_2$–$C_4$ hydroxyalkyl esters, their N-(hydroxy-$C_1$–$C_4$ alkyl)amides, and the aforementioned ethylenically unsaturated nitriles. Particularly preferred comonomers are the monoethylenically unsaturated monocarboxylic and dicarboxylic acids, especially acrylic acid, methacrylic acid, and itaconic acid.

In one particularly preferred embodiment the mixture of monomers M to be polymerized comprises from 40 to 70% by weight of styrene, from 30 to 59% by weight of butadiene, and from 1 to 10% by weight of an ethylenically unsaturated monocarboxylic or dicarboxylic acid.

In another preferred embodiment, some of the styrene, preferably from 5 to 20% by weight based on the overall monomer amount, has been replaced by acrylonitrile and/or methacrylonitrile. In this preferred embodiment, the mixture to be polymerized comprises, for example, from 30 to 65% by weight of styrene, from 30 to 59% by weight of butadiene, from 5 to 20% by weight of acrylonitrile and/or methacrylonitrile and from 1 to 10% by weight of an ethylenically unsaturated monocarboxylic or dicarboxylic acid.

In view of its use as a binder in colored paper coating slips, it has proven advantageous for the polymer resulting from the polymerization to have a glass transition temperature in the range from −20 to +50° C. and preferably in the range from 0 to 30° C. The glass transition temperature here is the mid point temperature determinable in accordance with ASTM 3418-82 by means of DSC.

The glass transition temperature may be controlled by way of the monomer mixture M used, in a known manner.

According to Fox (T. G. Fox, Bull. Am. Phys. Soc. (Ser. II) 1, 123 [1956] and Ullmanns Encyklopädie der technischen Chemie, Weinheim (1980), p. 17, 18), the glass transition temperature of copolymers at high molecular masses is given in good approximation by $$\frac{1}{T_g} = \frac{X^1}{T_g^1} + \frac{X^2}{T_g^2} + \cdots \frac{X^n}{T_g^n}$$

where $X^1$, $X^2$, ..., $X^n$ are the mass fractions of the monomers 1, 2, ..., n and $T_g^1$, $T_g^2$, ..., $T_g^n$ are the glass transition temperatures of the homopolymers of each of the monomers 1, 2, ..., n, in degrees Kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook 3rd ed., J. Wiley, New York 1989. Accordingly, polystyrene possesses a $T_g$ of 380 K. and polybutadiene a $T_g$ of 171 K. or 166 K., respectively.

The polymers obtainable by the process of the invention generally have a weight-average particle diameter of less than 1 000 nm. The $d_w$ value of the particle size is commonly defined as the weight average of the particle size, as determined by means of an analytical ultracentrifuge in accordance with the method of W. Scholtan and H. Lange, Kolloid-Z. und Z. -Polymere 250 (1972) pages 782 to 796. The ultracentrifuge measurement provides the integral mass distribution of the particle diameter of a sample. From this it is possible to derive what weight percentage of the particles have a diameter equal to or below a certain size. In the context of the inventive use in paper coating compositions, the weight-average particle diameter is preferably below 500 nm, in particular below 300 nm, and with particular preference in the range from 50 to 300 and with very particular preference in the range from 70 to 200 nm.

Methods of adjusting the polymer particle size of an aqueous polymer dispersion are known from the prior art. In order to establish a defined polymer particle size, the emulsion polymerization is preferably carried out in accordance with the seed latex technique or in the presence of a seed latex prepared in situ. Methods for this purpose are known and may be found in the prior art (see EP-B 40419 and also Encyclopedia of Polymer Science and Technology, Vol. 5, John Wiley & Sons Inc., New York 1966, p. 847).

In one preferred embodiment of the present invention, the polymerization is conducted in the presence of from 0.01 to 4% by weight, more preferably from 0.05 to 3% by weight and in particular from 0.1 to 1.5% by weight of a seed latex (solids content of the seed latex, based on overall monomer amount), preferably with seed latex in the initial charge (initial-charge seed). The latex generally has a weight-average particle size of from 10 to 400 nm, preferably from 20 to 120 nm, and in particular from 20 to 50 nm. Examples of its constituent monomers are styrene, methyl methacrylate, n-butyl acrylate, and mixtures thereof, with the seed latex also being able to contain in a minor amount ethylenically unsaturated carboxylic acids, e.g., acrylic acid and/or methacrylic acid and/or their amides, preferably less than 10% by weight, based on the overall weight of the polymer particles in the seed latex, in copolymerized form.

Following the polymerization reaction proper it may be necessary to free the aqueous polymer dispersions of the invention substantially from odorous substances, such as residual monomers and other volatile organic constituents.

This may be achieved in a manner known per se, physically by means of distillative removal (especially by way of steam distillation) or by stripping with an inert gas. The reduction in the amount of residual monomers may also be effected chemically by free-radical postpolymerization, especially under the action of redox initiator systems, as recited, for example, in DE-A 44 35 423, DE-A 44 19 518 and DE-A 44 35 422. The postpolymerization is referably conducted with a redox initiator system comprising at least one organic peroxide and one inorganic sulfite or with the salt of an α-hydroxysulfonic or α-sulfinic acid (adduct of hydrogen sulfite with carbonyl compound).

The polymer dispersions obtainable by the process of the invention are distinguished by good mechanical stabilities and comparatively low residual monomer contents. The present invention additionally provides colored paper coating slips comprising at least one styrene-butadiene copolymer in the form of one of the aqueous polymer dispersions of the invention.

Naturally, the principal constituent of the colored paper coating slips comprises at least one inorganic or organic pigment. Examples of inorganic pigments are clay minerals such as kaolin, barium sulfate, titanium dioxide, calcium carbonate, satin white, talc, aluminum hydroxide, zinc oxide, and the like. Examples of organic pigments are polystyrene latices and also urea-formaldehyde resins, which are preferably likewise used in the form of an aqueous dispersion. An embodiment of the colored paper coating slips that is preferred in accordance with the invention comprises a clay mineral, preferably kaolin, and also calcium carbonate as pigment.

The amount of binder in the colored paper coating slips of the invention is generally from 3 to 30 and preferably from 5 to 20 parts by weight per 100 parts by weight of pigment. The colored paper coating slips of the invention further contain in general from 0.1 to 5 parts by weight and preferably from 1 to 3 parts by weight of auxiliaries per 100 parts by weight of pigment. These auxiliaries include water resistance improvers, dispersing aids for the pigments, viscosity modifiers, hardeners, colored pigments, fluorescent dyes, pH modifiers, and cobinders.

The cobinders generally comprise water-soluble polymers such as casein, modified casein, starch, modified starch, polyvinyl alcohol, carboxymethylcellulose, polyacrylic acids, and the like. The cobinder fraction will generally not exceed 1 part by weight per 100 parts by weight of pigment.

As pH modifiers it is common to use bases, preferably inorganic bases such as sodium hydroxide, potassium hydroxide or calcium hydroxide. The colored paper coating slip preferably has a pH in the range from 7.5 to 9.5.

The colored paper coating slips of the invention are prepared in a customary manner by mixing of the components, preferably by addition of an aqueous polymer dispersion as obtainable by the process of the invention to an aqueous suspension of the pigment, which in general already contains some or all of the necessary auxiliaries.

The colored paper coating slips of the invention lead to coatings having improved pick resistance, especially wet pick resistance.

The examples which follow are intended to illustrate the invention without restricting it.

I. PREPARATION OF THE POLYMER DISPERSIONS OF THE INVENTION (EXAMPLES 1 AND 2)

Example 1 (Dispersion D1)

A polymerization vessel was charged with 300 g of water, 1.8 g of emulsifier solution, 37 g of a 33% by weight polymer seed ($d_{50}$ 30 nm) and also 10% of the initiator solution (feed stream 2) and 5% of the monomer emulsion (feed stream 1), and this initial charge was heated to 85° C.

Then the remainder of the monomer emulsion and the remainder of the initiator solution were added by way of two separate feeds into the polymerization vessel, beginning simultaneously, the additions taking place over the course of 4 h in the case of the monomer emulsion and over the course of 4.5 h in the case of the initiator solution, and the temperature during the feeds being maintained. During the polymerization, the pH was maintained using 16 g of a 25% strength by weight sodium hydroxide solution. After the end of the addition of monomer, the 85° C. were retained for a further 2 h, after which the mixture was cooled to 65° C. and 35 g of 10% strength aqueous sodium hydroxide solution were added. Then, beginning simultaneously, an aqueous solution of 2 g of tert-butyl hydroperoxide in 67 g of water and also a solution of 1.3 g of acetone and 2 g of sodium disulfite in 67 g of water were added over the course of 2 h, during which the temperature was maintained. After a further hour, the batch was cooled to room temperature.

| Feed stream 1: | |
| --- | --- |
| 269 g | of deionized water |
| 16 g | of emulsifier solution |
| 10 g | of tert-dodecyl mercaptan |
| 2 g | of terpinolene |
| 530 g | of styrene |
| 420 g | of butadiene |
| 50 g | of acrylic acid |
| Feed stream 2: | |
| 10 g | of sodium peroxidisulfate in 267 g of water |

Emulsifier solution: sodium lauryl sulfate, 28% by weight in water

The solids content of dispersion was about 50% by weight. The light transmittance was 61%. The weight-average particle size $d_{50}$ was 142 nm. The pH was 6.2 and the glass transition temperature $T_g$ was 5° C.

The glass transition temperature was determined by means of DSC as the mid point temperature. The relative light transmittance of the dispersion was determined against water (100%) on 0.01% strength by weight samples with a path length of 2.5 cm. The average particle diameter was determined according to ISO 13321 by means of quasielastic light scattering using a Malvern autosizer 2C on approximately 0.01% strength by weight samples.

Example 2 (Dispersion D2)

A polymerization vessel was charged with 300 g of deionized water, 1.8 g of emulsifier solution, 38 g of seed latex (polystyrene dispersion, 33% by weight, $d_{50}$ 30 nm) and also 5% of feed stream 1, 5% of feed stream 3, and 10% of feed stream 4, and this initial charge was heated to 85° C.

Subsequently, beginning simultaneously and by way of separate feeds, feed streams 1, 3, and 4 were added while maintaining the 85° C. Feed stream 1 was added over the course of 60 min, feed stream 3 over the course of 4 h, and feed stream 4 over the course of 4.5 h. Immediately after the end of feed stream 1, feed stream 2 was added to the polymerization vessel over the course of 3 h. During the polymerization, the pH of the reaction mixture was maintained using a total of 16 g of 25% strength by weight aqueous sodium hydroxide solution. After the end of feed streams 2 and 3, the 85° C. were retained and then 25 g of 10% strength aqueous sodium hydroxide solution were added. Then the solutions of tert-butyl hydroperoxide and also of acetone and sodium disulfite indicated in Example 1 were added over the course of 2 h. The mixture was subsequently neutralized using 30 g of a 10% strength by weight aqueous sodium hydroxide solution, and cooled to room temperature.

| Feed stream 1: | |
|---|---|
| 35 g | of deionized water |
| 4 g | of emulsifier solution |
| 2 g | of 25% strength aqueous sodium hydroxide solution |
| 14 g | of acrylic acid |
| 3 g | of terpinolene |
| 132 g | of styrene |
| Feed stream 2: | |
| 224 g | of deionized water |
| 12 g | of emulsifier solution |
| 6 g | of 25% strength aqueous sodium hydroxide solution |
| 36 g | of acrylic acid |
| 9 g | of tert-dodecyl mercaptan |
| 398 g | of styrene |
| Feed stream 3: | |
| 420 g | of butadiene |
| Feed stream 4: | |
| 10 g | of sodium peroxodisulfate in 267 g of water |

The resulting polymer dispersion had a pH of 6 and a solids content of approximately 50% by weight. The light transmittance was found to be 58%. The weight-average particle size $d_{50}$ was 135 nm. The polymer had a glass transition temperature of approximately 1° C.

II PERFORMANCE TESTING

1. Formulation for the Colored Coating Slip
   64 parts by weight of water
   70 parts by weight of calcium carbonate
   30 parts by weight of kaolin
   0.4 part by weight of sodium polyacrylate
   0.05 part by weight of sodium hydroxide (as a 25% strength by weight solution)
   0.5 part by weight of carboxymethylcellulose
   20 parts by weight of polymer dispersion (50% by weight), corresponding to 10 g of polymer.
   The solids content of the slip was 60%.

2. Preparation and testing of a coating paper
   The base paper used was a chemical coating base paper having a basis weight of 70 g/m². The paper coating composition was applied at 10 g/m² to one side on a laboratory coating machine. It was dried using an IR lamp. Before the performance tests, the papers were passed four times through a laboratory calender (one roll pair, linear pressure: 2 000 N/cm).

Dry Pick Resistance
Strips measuring 33×3 cm were cut lengthwise from the papers under test, and these strips were stored for 15 h at 27° C. and a relative humidity of 50% in a conditioning chamber.

The strips were subsequently printed in a printing unit (IGT printability tester AC2/AIC2) using a standard ink (printing ink 3808 from Lorilleux-Lefranc).

The test strips were passed through the printing unit at a continuously increasing speed (maximum speed 200 cm/s). The speed in cm/s at which 10 tears from the paper coating slip (picks) occurred after the beginning of printing is stated as a measure of the dry pick resistance.

Wet Pick Resistance
The test strips were prepared and made ready as described above.

The printing unit (IGT printability tester AC2/AIC2) was set up such that the test strips were moistened with water before the printing operation.

Printing was carried out at a constant speed of 0.6 cm/s.

Tears from the paper coating slip or the paper are visible as unprinted areas. To determine the wet pick resistance, therefore, an ink densitometer is used to determine the ink density in comparison with the solid tone, in %. The higher the stated ink density, the better the wet pick resistance.

Colored coating slip F1 comprises dispersion D1. Colored coating slip F2 comprises dispersion D2. For purposes of comparison, a commercial binder based on styrene/butadiene/acrylonitrile (DL 966 latex from Dow Chemical) was additionally used.

TABLE 1

| Slip | Binder | Dry pick resistance [cm/s] | Wet pick resistance [cm/s] |
|---|---|---|---|
| F1 | D1 | 106 | 95 |
| F2 | D2 | 102 | 95 |
| CF1 | CD1[1)] | 88 | 79 |

[1)]Latex DL 966

We claim:

1. A process for preparing an aqueous styrene-butadiene polymer dispersion comprising:
   polymerizing a monomer mixture M comprising
   styrene and
   butadiene,
   in a reaction vessel with a free-radical aqueous emulsion polymerization monomer feed technique, wherein at least 80% of the monomer mixture is added to the reaction vessel during polymerizing, and
   wherein at least 80% of a regulator system comprising
   from 0.05 to 0.4% by weight of terpinolene and
   from 0.5 to 2% by weight of at least one organic compound containing at least one SH group is continuously added to the reaction vessel during the addition of the monomer mixture,
   wherein % by weight is based on the total weight of the monomer mixture.

2. The process as claimed in claim 1, wherein during the addition of the regulator system the ratio of the amount of terpinolene already added to the amount of the organic compound containing at least one SH group already added goes down.

3. The process as claimed in claim 2, wherein the addition of the terpinolene is ended before the addition of the organic compound containing at least one SH group is ended.

4. The process as claimed in claim 2, wherein the addition of the organic compound containing at least one SH group is commenced after at least 50% of the total amount of the terpinolene has been added.

5. The process as claimed in claim 1, wherein the organic compound containing at least one SH group is at least one $C_4$–$C_{18}$ alkyl mercaptan.

6. The process as claimed in claim 1, wherein the monomer mixture further comprises one or more ethylenically unsaturated comonomers other than styrene and butadiene in an amount of up to 30% by weight.

7. The process as claimed in claim 6, wherein the comonomers other than styrene and butadiene are selected from the group consisting of a monoethylenically unsaturated monocarboxylic acid and a monoethylenically unsaturated dicarboxylic acids having from 3 to 10 carbon atoms, amides thereof, $C_2$–$C_4$ hydroxyalkyl esters thereof, N-(hydroxy-$C_1$–$C_4$ alkyl)amides thereof, and an ethylenically unsaturated nitrile.

8. The process as claimed in claim 6, wherein the monomer mixture comprises:
   from 40 to 70% by weight of styrene,
   from 30 to 59% by weight of butadiene, and
   from 1 to 10% by weight of at least one ethylenically unsaturated monocarboxylic or dicarboxylic acid.

9. The process as claimed in claim 1, wherein the monomer mixture comprises:
   from 30 to 65% by weight of styrene,
   from 30 to 59% by weight of butadiene,
   from 5 to 20% by weight of acrylonitrile, methacrylonitrile or both, and
   from 1 to 10% by weight of at least one ethylenically unsaturated monocarboxylic or dicarboxylic acid.

10. The process as claimed in claim 1, wherein the ratio of styrene to butadiene in the monomer mixture added to the polymerization changes by less than 20% during the addition of the monomer mixture to the reaction vessel.

11. An aqueous polymer dispersion obtained by the process as claimed in claim 1.

12. A colored paper coating slip comprising:
   i) at least one inorganic pigment,
   ii) from 5 to 20 parts by weight of at least one styrene-butadiene copolymer in the form of an aqueous polymer dispersion as claimed in claim 11,
   iii) from 0.1 to 5 parts by weight of customary auxiliaries, based in each case on 100 parts by weight of pigment.

13. The process as claimed in claim 1, wherein the organic compound containing at least one SH group is selected from the group consisting of N-hexyl mercaptan, N-octyl mercaptan, tert-octyl mercaptan, N-decyl mercaptan, N-dodecyl mercaptan, tert-dodecyl mercaptan, n-hexadecyl mercaptan, and stearyl mercaptan.

14. The process as claimed in claim 1, wherein the weight ratio of terpinolene to the organic compound containing at least one SH group is at least 1:10.

15. The process as claimed in claim 1, wherein the weight ratio of terpinolene to the organic compound containing at least one SH group is at most 1:1.5.

16. The process as claimed in claim 1, wherein the regulator system and the monomer mixture are added at the same time.

17. The process as claimed in claim 1, wherein the regulator system is added to the polymerization as a mixture with the monomer mixture.

18. The process as claimed in claim 1, wherein the organic compound containing at least one SH group is tert-dodecyl mercaptan.

19. The process as claimed in claim 1, wherein the polymerization is carried out in the presence of an anionic emulsifier.

20. The process as claimed in claim 1, wherein the polymerization is carried out in the presence of a polymerization initiator added in the form of an aqueous solution.

21. The process as claimed in claim 1, wherein not more than 20% of the total amount of the regulator is added before polymerization.

22. The process as claimed in claim 1, wherein the polymer formed during the polymerization is present in the form of particles having a weight-average diameter of from 70 to 200 nm.

23. The process as claimed in claim 1, wherein the process is carried out in the presence of a seed latex having a weight average particle diameter of from 10 to 400 nm.

24. The process as claimed in claim 1, wherein the regulator system comprises from 0.1 to 0.3% by weight of terpinolene.

25. The process as claimed in claim 1, wherein the compound containing at least one SH group is present in an amount of 0.7 to 1.5% by weight.

26. The process as claimed in claim 1, wherein the terpinolene is present in the regulator system in an amount of from 0.1 to 0.3% by weight and the organic compound containing at least one SH group is present in an amount of from 0.7 to 1.5% by weight.

* * * * *